United States Patent [19]
Gomez

[11] 3,752,335
[45] Aug. 14, 1973

[54] MOBILE SUGAR CANE WAGON UNLOADER

[75] Inventor: Ivan Gomez, Thibodaux, La.

[73] Assignee: Cane Machinery & Engineering Company, Inc., Thibodaux, La.

[22] Filed: Apr. 21, 1972

[21] Appl. No.: 246,328

[52] U.S. Cl. ............................................. 214/44 B
[51] Int. Cl. ......................................... B65g 67/30
[58] Field of Search ........................... 214/44 B, 64

[56] References Cited
UNITED STATES PATENTS
2,936,913  5/1960  Watt et al. ...................... 214/64 X
3,484,850  12/1969  Rodrigue ......................... 214/44 B

*Primary Examiner*—Robert G. Sheridan
*Attorney*—Wilkinson, Mawhinney & Theibault

[57] ABSTRACT

The present invention is directed to a mobile, transportable sugar cane wagon unloader which may be moved about from site to site by a tractor and which has ramps to receive loaded sugar cane wagons and which has a dumping wall immediately adjacent the ramps so that the unloader can pick up and dump the cane loaded on the wagon over the dump wall into a transport truck to be taken to the mill. When all the cane in a particular land section has been harvested, piled and loaded into cane wagons, transferred to transport trucks and taken to the mill, the device of the present disclosure may then be placed in its transport mode and moved to another harvest area.

5 Claims, 5 Drawing Figures

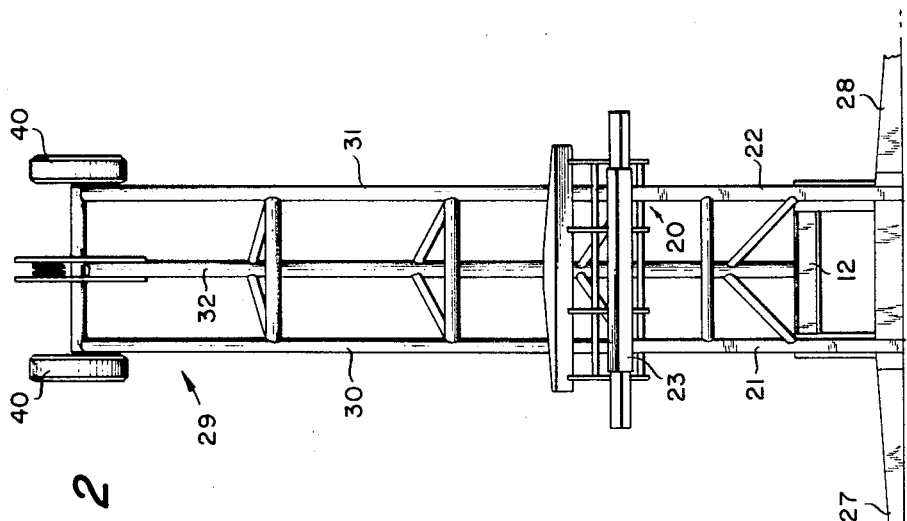
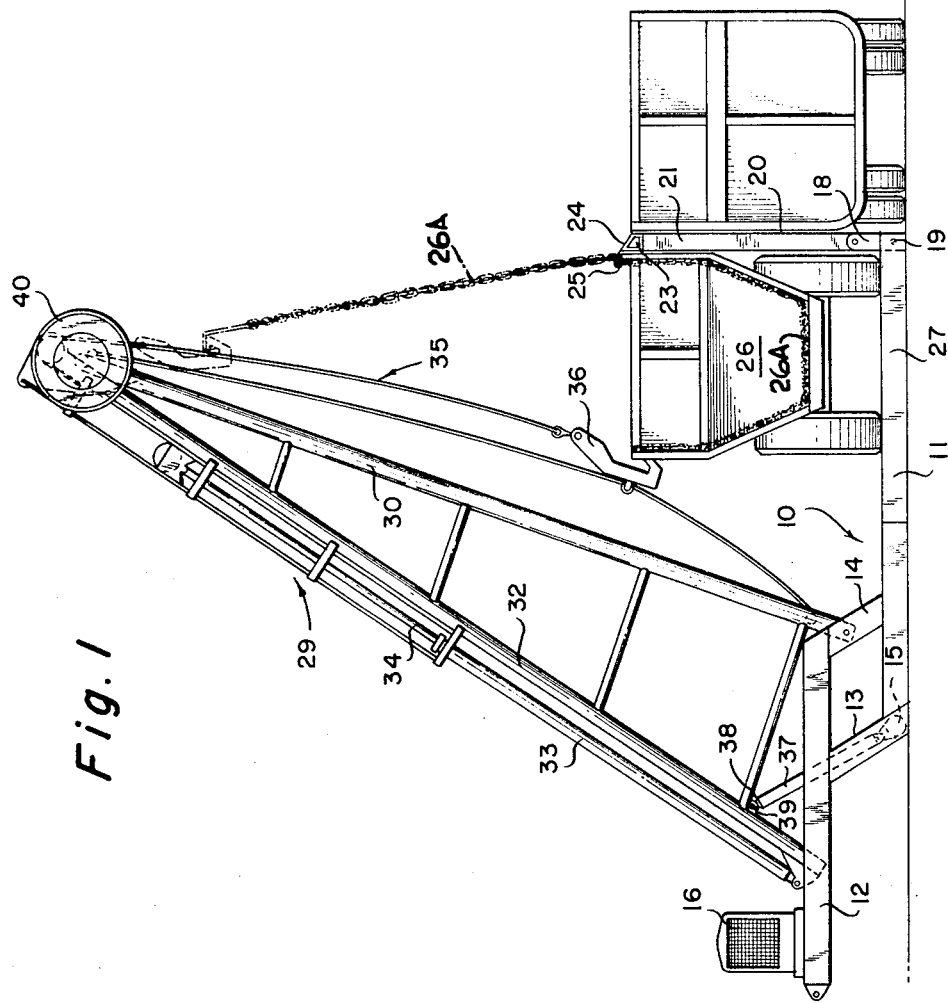

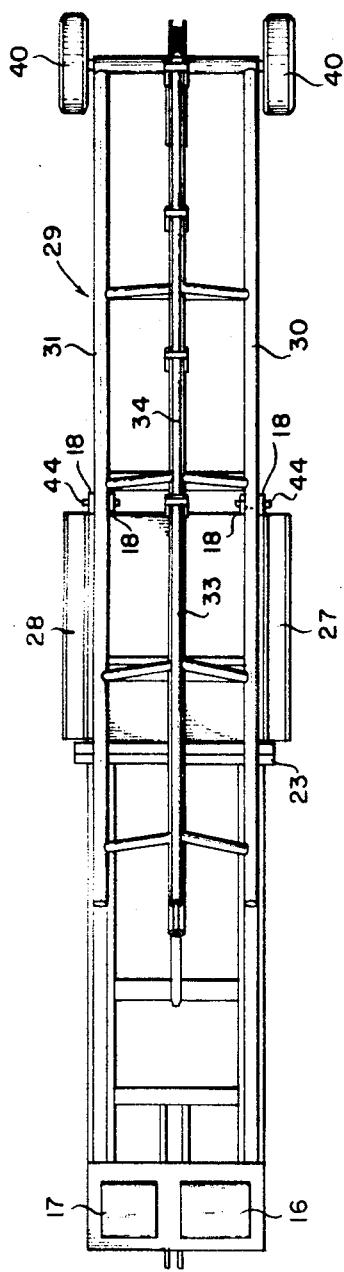
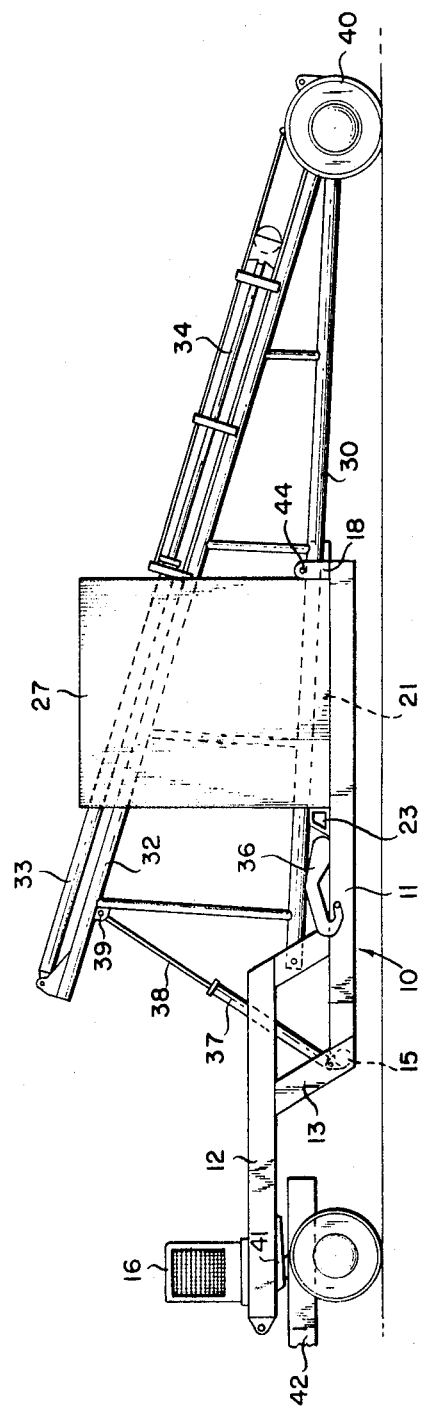
Fig. 4
Fig. 5

MOBILE SUGAR CANE WAGON UNLOADER

An object of the present invention is to provide a sugar cane wagon unloader at the harvesting site which will transfer the sugar cane from the wagons into a transport truck to be taken to the mill. U. S. Pat. No. 3,484,850 shows an unloading means for dumping the transport truck at the mill, however, since there are many more plantations growing sugar cane than there are mills and since there are many more cane wagons to be unloaded while the structure illustrated in U.S. Pat. No. 3,484,850 works fine at the mill it is not readily transportable from site to site and is not built to handle cane wagons.

A further object of the present invention is to combine the base, unloading boom and dumping wall so that the unloading boom performs two functions, operating as an unloader in one instance and as the backbone of the transport unit in the other instance.

A still further object of the present invention is the provision of cane wagon loading ramps immediately adjacent the dump wall so that the chain manifold placed in the bottom of the cane wagon prior to placement of the cane therein may be elevated causing the cane to slide over the dump wall and into the transport truck for its journey to the mill.

A further object of the present invention is to provide an apparatus of the type described which is compact and the components of which are nested to reduce road clearance for transport of the unit from site to site over narrow secondary roads.

With the foregoing and other objects in view, the invention will be more fully described hereinafter, and will be more particularly pointed out in the claims appended hereto.

In the drawings, wherein like symbols refer to like or corresponding parts throughout the several views:

FIG. 1 is a side elevational view of the cane wagon unloader set up at a transport truck loading side showing a cane wagon in position to be dumped.

FIG. 2 is a front elevational view of the cane wagon unloader of FIG. 1 with the cane wagon and transport truck removed.

FIG. 4 is a top plan view of the cane wagon unloader of FIGS. 1, 2 and 3 in the transport mode.

FIG. 5 is a side elevational view of the cane wagon unloader of FIG. 4 in the transport mode.

Figure 3:
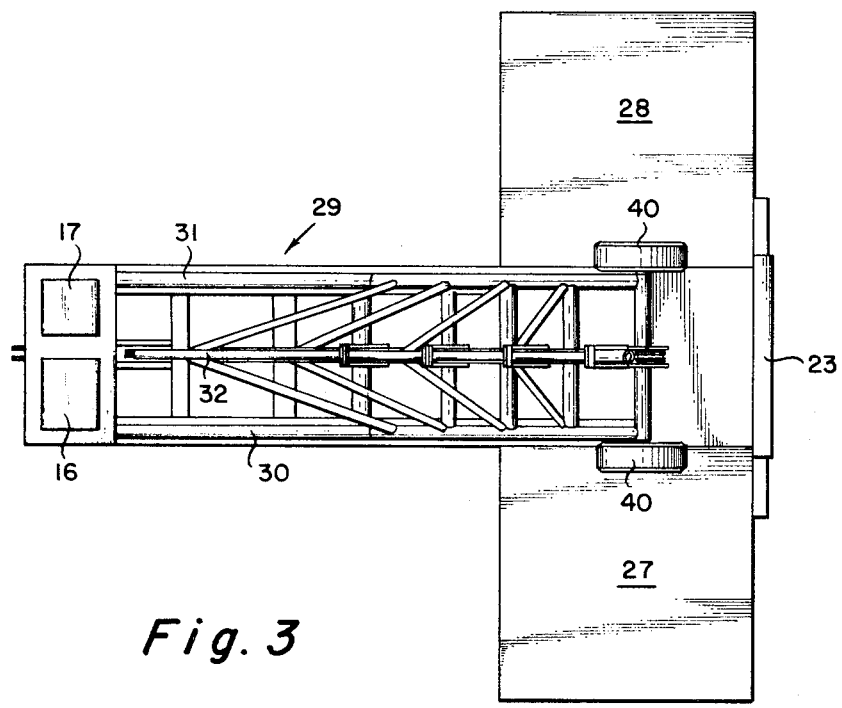
FIG. 3 is a top plan view of the cane wagon unloader of FIG. 1.

Referring now to the drawings, 10 designates generally a mobile base frame having a lower major portion 11 and a minor upper portion 12. The two portions 11 and 12 are joined by connecting members 13, 14. A pipe 15 connects the right and left sides of the base frame. Carried proximate one end of the upper minor portion 12 are the internal combustion power unit 16 and hydraulic power pack 17. The free end of the lower major portion 12 has upstanding from each side pivot plates 18, having a lower opening 19 to which at each side of the frame is pivoted the dumping wall 20 which comprises standards 21, 22 having a beam 23 connected thereto.

Pivotally secured to each side of the base frame 10 are inclined cane wagon ramps 27, 28 which may be in the lower position, as shown in FIGS. 2 and 3 to receive and assist the cane wagon 26 in being positioned adjacent the dumping wall 20.

The unloader rig designated at 29 is substantially as illustrated in U. S. Pat. No. 3,484,850 having side base boom members 30, 31 and an apex boom member 32. Each of the base members 30, 31 are pivotally connected to the side members 14 so that the rig may be placed either in the unload position of FIG. 1 or the tranport position shown in FIG. 5. A hydraulic cylinder and ram 33, 34, mounted on the apex member 32 control the cable 35 and the wagon hook 36 as shown in U.S. Pat. No. 3,484,850. Secured between the pipe 15 which joins each side of the base frame 10 between the major and minor portions is a cylinder 37 having a ram 38 connected to the apex boom member 32 of rig 29 at 39 to rock the rig between the positions of FIGS. 1 and 5. Secured to the free end of the rig 29 at each side thereof are a pair of ground transport wheels 40.

The underside of the free end of the minor portion 12 of the base frame 10 has a fifth wheel connection 41 to permit the entire unit to be connected to a tractor 42 for moving the unit from one unloading site to another.

OPERATION

With the mobile base 10 at the site where the cane wagons 26 are to be received and unloaded the mobile unit is in its static or unload mode as shown in FIGS. 1, 2 and 3, with the rig 29 erected so that its free upper end will over hang the cane wagons 26 which are pulled by tractor up the ramp 27 to place it immediately adjacent the dumping wall 20. A large transport truck 43 is placed on the opposite side of the dumping wall 20. The truck trailer body 43 will receive and transport many cane wagon loads of cane to the mill. The hook is engaged beneath the free end of a chain net manifold 26A which has been placed in the bottom and sides of the cane wagon 26 as shown in FIG. 1 prior to loading the cane into the wagon. One end of the chain net manifold 26A is secured to the pipe 25 on cane wagon 26. Upon actuation of cylinder 33 and ram 34 the cable 35 and hook 36 will raise the chain net manifold 26A to the chain line position of FIG. 1 causing the cane to slide over the dump wall 20 and dump the contents of sugar cane stalks carried in wagon 26 into the transport trailer 43 for transport to the mill.

When harvesting and transport of the cane in a particular area has been completed the apparatus of the present invention is connected to a tractor and moved to the new harvesting and loading site. The transport truck 43 and cane wagons 26 are removed. The dump wall 20 is rotated about its pivot from the position of FIG. 1 to the horizontal position of FIG. 5. The cylinder and ram unit 37, 38 rotates the rig from the position of FIG. 1 to that of FIG. 5. The openings at the top of the pivot plates 18 receives a locking bar 44 which seats behind boom members 30, 31 to make the unit a compact transportable device resting on the tractor at one end and on the transport wheels 40 at the other end. The cane wagon loading ramps 27, 28 are then pivoted upwardly as shown in FIGS. 4 and 5 to meet minimum width requirements for travel over secondary roads.

What is claimed is:

1. A mobile cane wagon unloader for use with a tractor comprising
   a. a mobile base frame,
   b. an unloader rig pivotally mounted proximate one end of said base frame movable between an erect wagon unloading position and a down transport position,
c. a cane wagon dumping wall pivotally mounted to said base frame at the end thereof opposite the unloader rig,
d. cane wagon approach ramps pivotally connected to said base frame adjacent said cane cart dumping wall,
e. means on said unloader rig for picking up one end of a chain net manifold causing the cane lying on said manifold to slide over dumping wall,
f. transport wheels mounted on the free end of said unloader rig for transporting the base frame and rig from one wagon unloading site to another, and
g. means carried by said base frame for securing said unloader rig to said base frame in a transport mode from one site to another.

2. A mobile cane wagon unloader as claimed in claim 1 wherein the base frame has a major lower portion and a minor upper portion and connecting means between said major and minor portions, and a tractor fifth wheel towing connection under the minor portion of said base frame.

3. A mobile cane wagon unloader as claimed in claim 2 wherein said unloader rig is triangular in cross section with the apex of the triangle up and a hydraulic lift cylinder and ram is connected to lift cable and hook for lifting the chain net manifold mounted on side of said wagon.

4. A mobile cane wagon unloader as claimed in claim 3 wherein said cane wagon dumping wall is pivotally connected to the bottom portion of upstanding members at the end of said major lower portion of said base member and said upstanding members have openings above the pivotal connection so that the wall stays erect at the site and that during transport to another site a locking means passes through the upper openings to secure the rear of the major portion of said base to the unloader rig with the transport wheels in contact with the ground.

5. A mobile cane wagon unloader as claimed in claim 4 further comprising hydraulic jack means connected between said main base frame and said unloader rig to rock said rig about its pivot with said base frame between a cane wagon unloading condition and a transport condition.

* * * * *